(12) United States Patent
Mitchell et al.

(10) Patent No.: US 11,250,848 B2
(45) Date of Patent: Feb. 15, 2022

(54) CONTROLLING NAVIGATION

(71) Applicant: Audio Analytic Ltd, Cambridgeshire (GB)

(72) Inventors: Christopher James Mitchell, Cambridgeshire (GB); Sacha Krstulovic, Cambridgeshire (GB); Cagdas Bilen, Cambridgeshire (GB); Neil Cooper, Cambridgeshire (GB); Julian Harris, Cambridgeshire (GB); Arnoldas Jasonas, Cambridgeshire (GB); Joe Patrick Lynas, Cambridgeshire (GB)

(73) Assignee: AUDIO ANALYTIC LTD, Cambridge (GB)

( * ) Notice: Subject to any disclaimer, the term of this patent is extended or adjusted under 35 U.S.C. 154(b) by 134 days.

(21) Appl. No.: 16/580,864

(22) Filed: Sep. 24, 2019

(65) Prior Publication Data

US 2021/0090560 A1    Mar. 25, 2021

(51) Int. Cl.
| | | |
|---|---|---|
| *G10L 15/22* | (2006.01) | |
| *G10L 15/20* | (2006.01) | |
| *G06F 3/16* | (2006.01) | |
| *G09B 5/06* | (2006.01) | |
| *G10L 15/30* | (2013.01) | |
| *G10L 15/26* | (2006.01) | |

(52) U.S. Cl.
CPC ............. *G10L 15/22* (2013.01); *G06F 3/167* (2013.01); *G09B 5/06* (2013.01); *G10L 15/20* (2013.01); *G10L 15/26* (2013.01); *G10L 15/30* (2013.01); *G10L 2015/223* (2013.01); *G10L 2015/228* (2013.01)

(58) Field of Classification Search
CPC .... G10L 15/222; G10L 15/1815; G10L 25/78
See application file for complete search history.

(56) References Cited

U.S. PATENT DOCUMENTS

| | | | | |
|---|---|---|---|---|
| 6,820,056 | B1 * | 11/2004 | Harif ....................... | G10L 15/26 704/270 |
| 2018/0374512 | A1 * | 12/2018 | Celinski ............... | G11B 27/031 |
| 2019/0066681 | A1 * | 2/2019 | Hsu ....................... | B66B 1/3461 |

OTHER PUBLICATIONS

Nassar, Hamed & Taha, Ahmed & Nazmy, T & Nagaty, Khaled. (2008). Retrieving of Video Scenes Using Arabic Closed-Caption. International Journal of Intelligent Computing and Information Systems (IJICIS). 8. 191-203. (Year: 2008).*
Igarashi T, Hughes JF. Voice as sound: using non-verbal voice input for interactive control. InProceedings of the 14th annual ACM symposium on User interface software and technology Nov. 1, 20011 (pp. 155-156). (Year: 2001).*

* cited by examiner

*Primary Examiner* — Daniel C Washburn
*Assistant Examiner* — Athar N Pasha
(74) *Attorney, Agent, or Firm* — Tarolli, Sundheim, Covell & Tummino LLP

(57) ABSTRACT

Control of navigation of a content item is carried out by detection of non-verbal sound events. On the basis of receipt of one or more non-verbal sound event reports, a navigation tool is provided with a corresponding sequence of navigation commands. The correspondence between navigation command sequences and non-verbal sound events is established through analysis or markup of the content item.

12 Claims, 5 Drawing Sheets

CONTROLLING NAVIGATION

FIELD

The present disclosure generally relates to controlling navigation by a computing device of a structured information entity, such as a document or other type of data file, and to related systems, methods and computer program code.

BACKGROUND

Background information on sound recognition systems and methods can be found in the applicant's PCT application WO2010/070314, which is hereby incorporated by reference in its entirety.

The present applicant has recognised the potential for new applications of sound recognition systems.

SUMMARY

This disclosure acknowledges that user experience in browsing through a structured information entity, such as a webpage, a document, or a media file, or otherwise navigating through a structured information entity, can be hampered by the need for deliberate user input action. Such deliberate user input action might comprise a manual interaction, be it with a physical keyboard, button, or an on-screen display employed in conjunction with a touch screen or a pointing device (e.g. mouse or touch pad). Alternatively or additionally, such deliberate user input action could comprise voiced verbal commands, detected by a speech detection module running on or accessible by the computing device.

Manual input can be inappropriate or inconvenient in some use cases, such as when hands may be dirty or the environment runs the risk of imparting grease or other undesirable substances on an input area of a device. Similarly, it can be inconvenient for a user to have to provide voice commands to a device, particularly when to do so could be distracting, embarrassing or otherwise inhibiting. Also, there can be situations where it can be useful for the navigation of information to carry on even when the user attention is focusing on something else, for example social situations of caring for guests or attention being focused on driving or operating dangerous tools.

Embodiments disclosed herein provide an approach to interaction with a structured information element, taking account of the above.

In general terms, an aspect of the present disclosure provides a computer system comprising a non-verbal sound detector which is operable to monitor an audio feed and to process sound events. The sound detector in use outputs a sequence of sound event symbols, which preferably comprise a sound event label and a timestamp. A navigation command mapper is operable to identify, for a structured information entity, one or more navigation commands compatible with the structured information entity. The navigation command mapper is then operable to create a mapping of the one or more navigation commands to corresponding sound events. Then, on receipt of a sequence of sound event symbols, the navigation command mapper is operable to identify a navigation command to be applied to the structured information entity, the navigation command being mapped to by the sequence of sound event symbols.

In general terms, an aspect of the present disclosure provides a method combining detecting a non-verbal sound with issuing navigation commands. The non-verbal sound detecting comprises detecting non-verbal sound events. The issuing of navigation commands is responsive to a detected non-verbal sound event, by mapping that sound event to a navigation action, applied to an information entity. The information entity may be for example, a structured information entity such as a collection of information elements structured using structure data.

The structure data may, for instance, be mark-up elements inserted into information for generation of an output.

The mark-up elements can comprise link information embedded in a first information to cause navigation from the first information element to a second information element. The output can, for example, be visual (text and/or graphics). The output can, in another example or additionally, be audible.

The mark-up elements may comprise time points in an audio or video file, for playback of the file from a specific time point in that file.

Structure data may be included in the information entity ab initio, or may be inserted into the information entity as a result of additional processing, including text analysis processing and/or image analysis processing.

The navigation tool may be operable to generate a mapping between non-verbal sound events and navigation events. The mapping may be based on content of the information entity. The navigation tool may comprise a mapping model developed by machine learning, to determine an approach to analysis of the information entity and any structured information embedded therein or provided therewith, to develop a mapping between non-verbal sound events and navigation events.

A mapping model may be developed, alternatively or additionally, with the assistance of human input action. So, for example, a human input may provide guidance to the navigation tool as to appropriate mappings between non-verbal sound events and navigation events.

It will be appreciated that the functionality of the devices described herein may be divided across several modules. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), GPU (Graphical Processing Unit), TPU (Tensor Processing Unit) or NPU (Neural Processing Unit) etc. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system, on a digital signal processor (DSP) or on a specially designed math acceleration unit such as a Graphical Processing Unit (GPU) or a Tensor Processing Unit (TPU). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
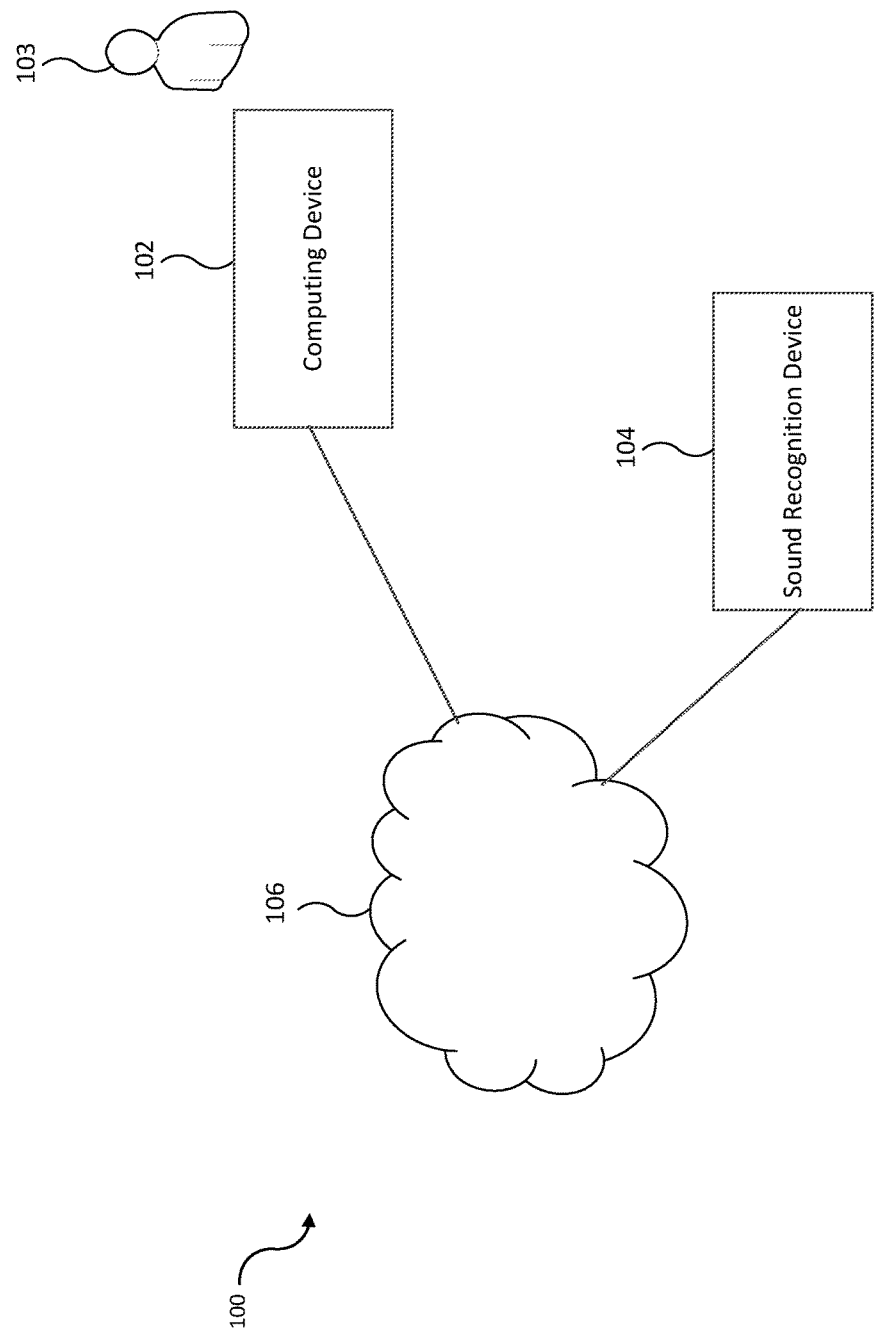
FIG. 1 shows a block diagram of example devices in a monitored environment.

FIG. 1 shows a computing device 102 in a monitored environment 100 which may be an indoor space (e.g. a house, a gym, a shop, a railway station etc.), an outdoor space or in a vehicle.

The network 106 may be a wireless network, a wired network or may comprise a combination of wired and wireless connections between the devices.

As described in more detail below, the computing device 102 may perform audio processing to recognise, i.e. detect, a target sound in the monitored environment 100. In alternative embodiments, a sound recognition device 104 that is external to the computing device 102 may perform the audio processing to recognise a target sound in the monitored environment 100 and then alert the computing device 102 that a target sound has been detected.

Figure 2:
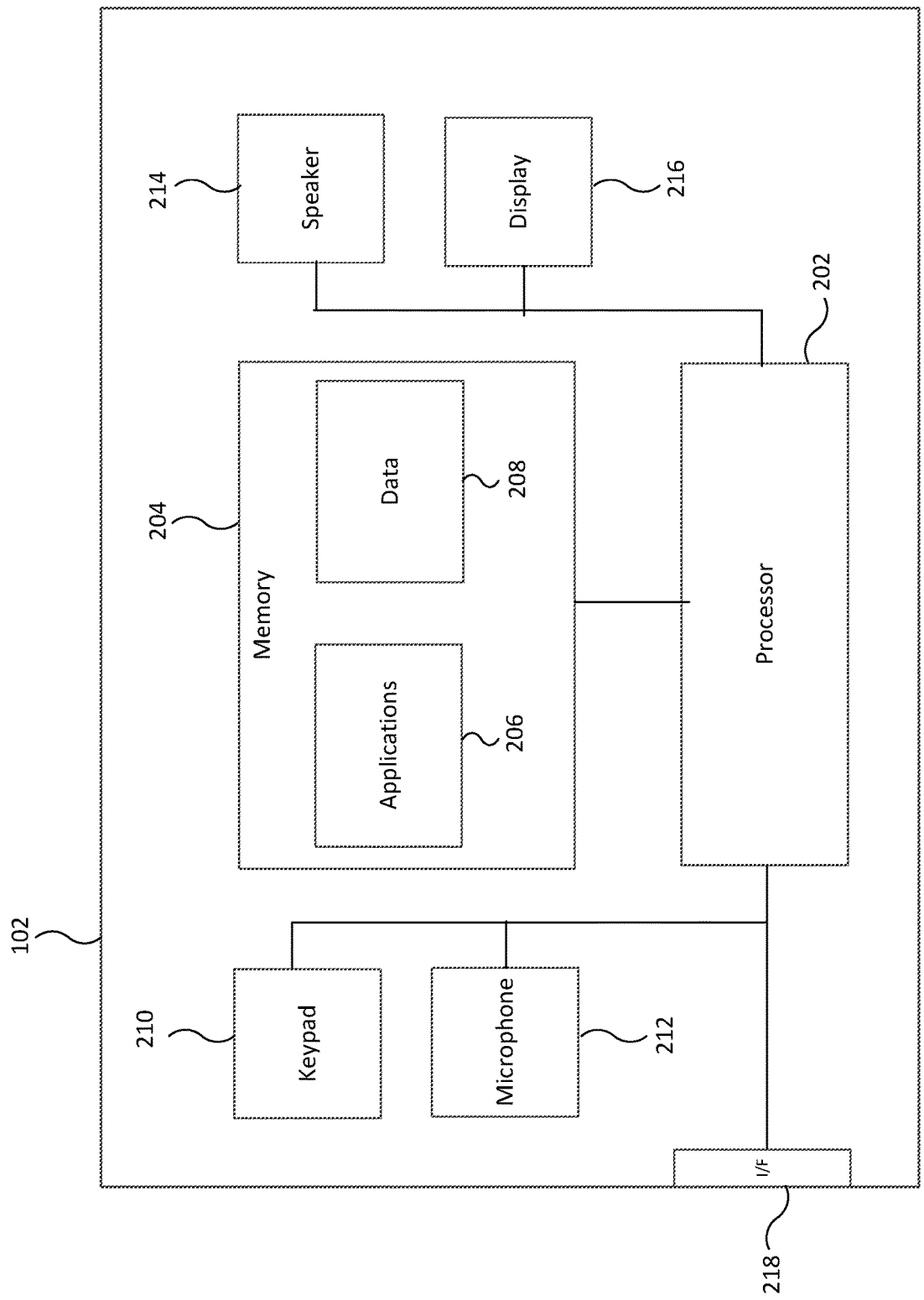
FIG. 2 shows a block diagram of a computing device.

FIG. 2 shows a block diagram of the computing device 102. It will be appreciated from the below that FIG. 2 is merely illustrative and the computing device 102 of embodiments of the present disclosure may not comprise all of the components shown in FIG. 2.

The computing device 102 may be a PC, a mobile computing device such as a laptop, smartphone, tablet-PC, a consumer electronics device (e.g. a smart speaker, TV, headphones, wearable device etc.), or other electronics device (e.g. an in-vehicle device). The computing device 102 may be a mobile device such that a user 103 can move the computing device 102 around the monitored environment. Alternatively, the computing device 102 may be fixed at a location in the monitored environment (e.g. a panel mounted to a wall of a home). Alternatively, the device may be worn by the user by attachment to or sitting on a body part or by attachment to a piece of garment.

Figure 3:
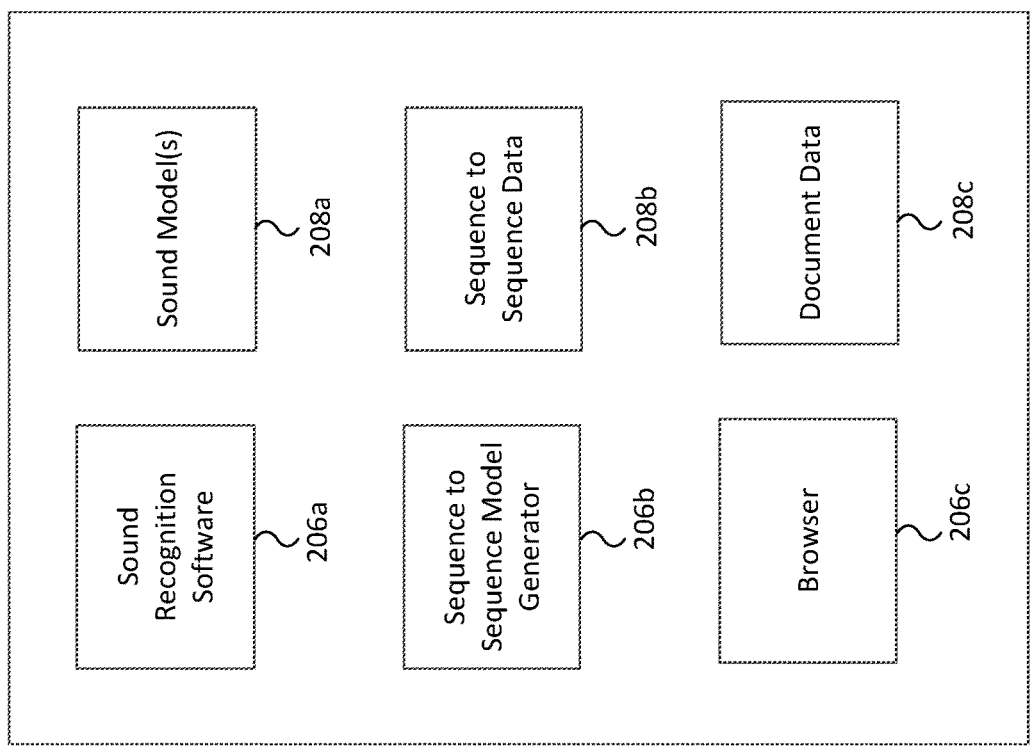
FIG. 3 shows a block diagram of software implemented on the computing device.

The computing device 102 comprises a processor 202 coupled to memory 204 storing computer program code of application software 206 operable with data elements 208. As shown in FIG. 3, a map of the memory in use is illustrated. A sound recognition software 206a is used to recognise a target sound, by comparing detected sounds to one or more sound models 208a stored in the memory 204. The sound model(s) 208a may be associated with one or more target sounds (which may be for example, a breaking glass sound, a smoke alarm sound, a baby cry sound, a sound indicative of an action being performed, etc.).

A sequence to sequence model generator 206b generates sequence information 208b on the basis of content data. Content data, such as document data 208c, is handled by a browser 206c to provide audio-visual output to a user. The browser 206c is responsive to navigation commands to manage the way that the audio-visual output is presented to the user. These navigation commands, such as "scroll down", "scroll up", "select hypertext link", "start video", "pause video", can be preconfigured by a generator of document data. The relationship between these navigation commands, and potentially appropriate non-verbal sounds which may trigger such navigation commands for a particular document, can be embedded in the document itself, and extracted by the sequence to sequence generator 206b such as using tags or metadata, or can be deduced by the sequence to sequence generator 206b automatically based on processing information contained in and about the document 208c. The manner in which the sequence to sequence generator 206b can perform this automatic generation of a relationship between non-verbal detected sounds and command sequences, will be described in more detail in due course.

The computing device 102 may comprise one or more input device e.g. physical buttons (including single button, keypad or keyboard) or physical control (including rotary knob or dial, scroll wheel or touch strip) 210 and/or microphone 212. The computing device 102 may comprise one or more output device e.g. speaker 214 and/or display 216. It will be appreciated that the display 216 may be a touch sensitive display and thus act as an input device.

The computing device 102 may also comprise a communications interface 218 for communicating with the one or more controllable devices 108 and/or the sound recognition device. The communications interface 218 may comprise a wired interface and/or a wireless interface.

As shown in FIG. 3, the computing device 102 may store the sound models locally (in memory 204) and so does not need to be in constant communication with any remote system in order to identify a captured sound. Alternatively, the storage of the sound model(s) 208a is on a remote server (not shown in FIG. 2) coupled to the computing device 102, and sound recognition software 206 on the remote server is used to perform the processing of audio received from the computing device 102 to recognise that a sound captured by the computing device 102 corresponds to a target sound. This advantageously reduces the processing performed on the computing device 102.

Sound Model and Identification of Target Sounds

A sound model 208a associated with a target sound is generated based on processing a captured sound corresponding to the target sound class. Preferably, multiple instances of the same sound are captured more than once in order to improve the reliability of the sound model generated of the captured sound class.

In order to generate a sound model the captured sound class(es) are processed and parameters are generated for the specific captured sound class. The generated sound model comprises these generated parameters and other data which can be used to characterise the captured sound class.

There are a number of ways a sound model associated with a target sound class can be generated. The sound model for a captured sound may be generated using machine learning techniques or predictive modelling techniques such as: hidden Markov model, neural networks, support vector machine (SVM), decision tree learning, etc.

The applicant's PCT application WO2010/070314, which is incorporated by reference in its entirety, describes in detail various methods to identify sounds. Broadly speaking an input sample sound is processed by decomposition into frequency bands, and optionally de-correlated, for example, using PCA/ICA, and then this data is compared to one or more Markov models to generate log likelihood ratio (LLR) data for the input sound to be identified. A (hard) confidence threshold may then be employed to determine whether or not a sound has been identified; if a "fit" is detected to two or more stored Markov models then preferably the system picks the most probable. A sound is "fitted" to a model by effectively comparing the sound to be identified with expected frequency domain data predicted by the Markov model. False positives are reduced by correcting/updating means and variances in the model based on interference (which includes background) noise.

It will be appreciated that other techniques than those described herein may be employed to create a sound model.

The sound recognition system may work with compressed audio or uncompressed audio. For example, the time-frequency matrix for a 44.1 KHz signal might be a 1024 point FFT with a 512 overlap. This is approximately a 20 milliseconds window with 10 millisecond overlap. The resulting 512 frequency bins are then grouped into sub bands, or example quarter-octave ranging between 62.5 to 8000 Hz giving 30 sub-bands.

A lookup table can be used to map from the compressed or uncompressed frequency bands to the new sub-band representation bands. For the sample rate and STFT size example given the array might comprise of a (Bin size÷2)×6 array for each sampling-rate/bin number pair supported. The rows correspond to the bin number (centre)—STFT size or number of frequency coefficients. The first two columns determine the lower and upper quarter octave bin index numbers. The following four columns determine the proportion of the bins magnitude that should be placed in the corresponding quarter octave bin starting from the lower quarter octave defined in the first column to the upper quarter octave bin defined in the second column. e.g. if the bin overlaps two quarter octave ranges the 3 and 4 columns will have proportional values that sum to 1 and the 5 and 6 columns will have zeros. If a bin overlaps more than one sub-band more columns will have proportional magnitude values. This example models the critical bands in the human auditory system. This reduced time/frequency representation is then processed by the normalisation method outlined. This process is repeated for all frames incrementally moving the frame position by a hop size of 10 ms. The overlapping window (hop size not equal to window size) improves the time-resolution of the system. This is taken as an adequate representation of the frequencies of the signal which can be used to summarise the perceptual characteristics of the sound. The normalisation stage then takes each frame in the sub-band decomposition and divides by the square root of the average power in each sub-band. The average is calculated as the total power in all frequency bands divided by the number of frequency bands. This normalised time frequency matrix is the passed to the next section of the system where a sound recognition model and its parameters can be generated to fully characterise the sound's frequency distribution and temporal trends.

The next stage of the sound characterisation requires further definitions.

A machine learning model is used to define and obtain the trainable parameters needed to recognise sounds. Such a model is defined by:
 a set of trainable parameters $\theta$, for example, but not limited to, means, variances and transitions for a hidden Markov model (HMM), support vectors for a support vector machine (SVM), weights, biases and activation functions for a deep neural network (DNN),
 a data set with audio observations o and associated sound labels l, for example a set of audio recordings which capture a set of target sounds of interest for recognition such as, e.g., baby cries, dog barks or smoke alarms, as well as other background sounds which are not the target sounds to be recognised and which may be adversely recognised as the target sounds. This data set of audio observations is associated with a set of labels l which indicate the locations of the target sounds of interest, for example the times and durations where the baby cry sounds are happening amongst the audio observations o.

Generating the model parameters is a matter of defining and minimising a loss function $\mathcal{L}(\theta|,l)$ across the set of audio observations, where the minimisation is performed by means of a training method, for example, but not limited to, the Baum-Welsh algorithm for HMMs, soft margin minimisation for SVMs or stochastic gradient descent for DNNs.

To classify new sounds, an inference algorithm uses the model to determine a probability or a score $P(C|o,\theta)$ that new incoming audio observations o are affiliated with one or several sound classes C according to the model and its parameters $\theta$. Then the probabilities or scores are transformed into discrete sound class symbols by a decision method such as, for example but not limited to, thresholding or dynamic programming.

The models will operate in many different acoustic conditions and as it is practically restrictive to present examples that are representative of all the acoustic conditions the system will come in contact with, internal adjustment of the models will be performed to enable the system to operate in all these different acoustic conditions. Many different methods can be used for this update. For example, the method may comprise taking an average value for the sub-bands, e.g. the quarter octave frequency values for the last T number of seconds. These averages are added to the model values to update the internal model of the sound in that acoustic environment.

In embodiments whereby the computing device 102 performs audio processing to recognise a target sound in the monitored environment 100, this audio processing comprises the microphone 212 of the computing device 102 capturing a sound, and the sound recognition 206a analysing this captured sound. In particular, the sound recognition 206a compares the captured sound to the one or more sound models 208a stored in memory 204. If the captured sound matches with the stored sound models, then the sound is identified as the target sound.

A sequence of identified target sounds can thus be passed to the sequence to sequence model 206b for processing in the context of controlling navigation of a document 208c being supported by the browser 206c.

In this disclosure, target sounds of interest are non-verbal sounds. A number of use cases will be described in due course, but the reader will appreciate that a variety of non-verbal sounds could operate as triggers for navigation actions. The present disclosure, and the particular choice of examples employed herein, should not be read as a limitation on the scope of applicability of the underlying concepts.

Sequence to Sequence Model

The resulting sequence of non-verbal sound identifiers generated by the sound recognition 206a and is translated into a sequence of document browsing commands through the sequence-to-sequence model 208b. The sequence-to-sequence model 208b encodes the relationship between sound sequences and their document browsing counterparts, given the knowledge of the document or type of document which is being browsed, and the position in the document.

The sequence-to-sequence model encodes the probability $P(\bar{b}|d,\bar{s})$ of a sequence of browsing commands $\bar{b}$ given some information about the document d which is being browsed, and given the incoming sequence of sound identifiers $\bar{s}$.

Information d about the document can include position into the document, type of document, or the full document itself, and can be determined by automatic means, for example automatic text analysis or image analysis to recognise which document it is and where the browsing is at.

All valid instances of a sequence-to-sequence model apply to represented probability $P(\bar{b}|d,\bar{s})$. For example, $P(\bar{b}|d,\bar{s})$ can be estimated from data by machine learning, for example using Recurrent Neural Networks, or it can be encoded as mark-up into the document, or it can be encoded explicitly into a computer program.

So, for example, if a document which is processed is a text document which describes a recipe for cooking a meal, the sequence-to-sequence model will analyse the document and will generate responses to sequences of sound identifiers such as the sound of frying, including the time at which the sound was identified as beginning and ending. In response to this, for example, the sequence to sequence model would indicate a browsing action to cause the browser to move onto the next stage in the recipe.

Management of Navigation

Figure 4:
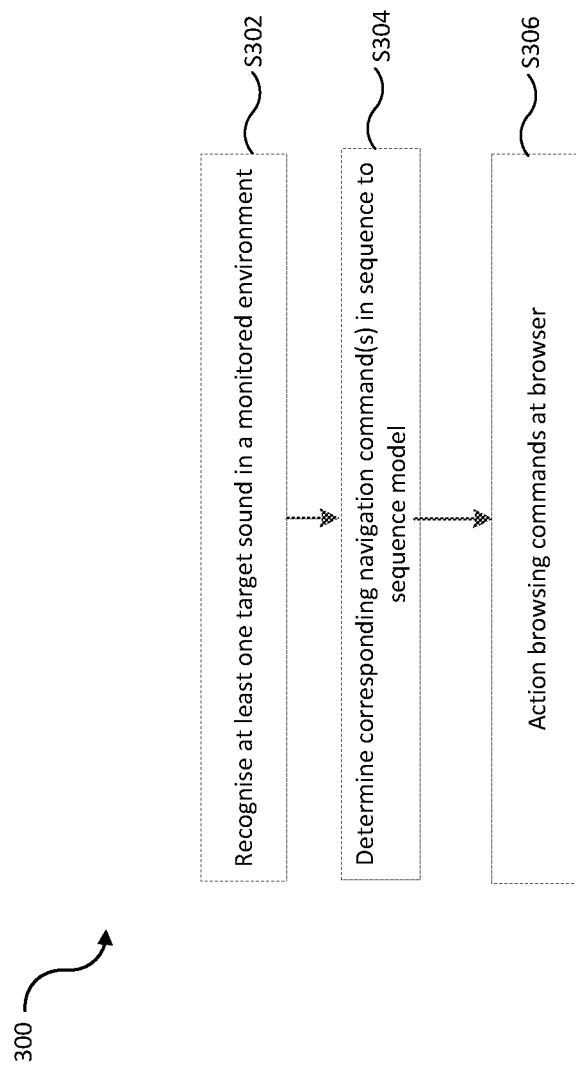
FIG. 4 is a flow chart illustrating a process to control a user interface of the computing device according to an embodiment.

FIG. 4 is a flow chart illustrating a process 300 to control a user interface of the computing device according to a first embodiment. The steps of the process 300 are performed by the processor 202.

At step S302, the processor 202 recognises a target sound in the monitored environment 100.

The microphone 212 of the computing device 102 is arranged to capture a sound in the monitored environment 100. Step S302 may be performed by the processor converting the captured sound pressure waves into digital audio samples and executing the sound recognition software 206 to analyse the digital audio samples (the digital audio samples may be compressed by the processor prior to this analysis being performed). In particular, the sound recognition software 206 compares the captured sound to the one or more sound models 208 stored in memory 204. If the captured sound matches with the stored sound models, then the captured sound is identified as a target sound. Alternatively, the processor 202 may transmit the captured sound via communications interface 218 to a remote server for processing to recognise whether the sound captured by the computing device 102 corresponds to a target sound. That is, the processor 202 may recognise a target sound in the monitored environment 100 based on receiving a message from the remote server that the sound captured by the computing device 102 corresponds to a target sound.

Alternatively, the microphone of the sound recognition device 104 may be arranged to capture a sound in the monitored environment 100 and process the captured sound to recognise whether the sound captured by the sound recognition device 104 corresponds to a target sound. In this example, the sound recognition device 104 is configured to transmit a message via the network 106 to the computing device 102 to alert the computing device 102 that a target sound has been detected. That is, the processor 202 may recognise a target sound in the monitored environment 100 based on receiving a message from the sound recognition device 104.

Regardless of where the processing of the captured sound is performed, the recognition of a target sound comprises recognising a non-verbal sound that may be generated in the environment of the sound capture device (the computing device 102 or the sound recognition device 104), for example a breaking glass sound, smoke alarm sound, baby cry sound, or an onomatopoeic utterance.

At step S304, the processor 202 determines a sequence of navigation commands associated with the target sound or sequence of target sound events.

At step S306, the processor 202 passes the sequence of navigation commands to the browser, to cause a corresponding output to a user of the device.

There follows a number of use cases designed to demonstrate the scope of the applicability of the above described technologies. None of these use cases should be construed as a limitation on potential applicability.

1. Process Documents

A document may comprise text which contains a series of instructions to a user. Typical examples of such documents include recipes for cooking, scientific experiments, or maintenance guides.

So, for a document encountered by the sequence-to-sequence generator 206b, one task is to identify individual steps into which the document can be fragmented. Then, navigation between these steps can be established. Some writers of documents may indicate steps using numbering, for example. The present disclosure contemplates using text analysis to identify steps, including using such indicators as are provided by the originator of the content. Such indicators could include, for example, tags or other mark-up tokens.

Then, using text analysis of, for instance, a recipe, text may be encountered which can be determined as matching with a non-verbal sound. So, for instance, a recipe might include a phrase indicating that an onion should be chopped. The sequence to sequence generator would derive, from this, that it should build a sequence on the basis of receiving a sound event comprising the start of chopping and another sound event comprising the cessation of chopping. In response to this, the sound sequence would map to a navigation command to move onto the next step in the recipe.

2. Audiovisual Content

A piece of content may comprise an audiovisual presentation.

Thus, in a particular example of this, an audiovisual presentation may be provided which is intended to instruct a user on carrying out a physical exercise workout routine. The presentation would comprise a structured set of workout videos, for example a training programme or a high intensity interval training (HIIT) sequence.

The navigation tool, in this case, could be configured to navigate from one workout video to another, responsive to detection of particular sound events, such as the sound of footsteps, breathing, spontaneous non-verbal sounds such as groaning, or exercise weights hitting the floor.

So, for example, a video may be produced to explain how to maintain a particular functional part of a vehicle.

In this case, the sequence to sequence generator may use speech and/or image analysis to determine target sounds for detection, and how the playback of the video may be responsive thereto.

So, for instance, a particular stage in maintenance may require the use of a ratchet spanner to tighten a nut. In this case, the sequence to sequence generator may map the sound event of a ratchet spanner being used, as a trigger for pausing a video presentation, and the sound event of cessation of a ratchet spanner being used to cause resumption of the video presentation.

Responsiveness to sounds can be conditional. So, for instance, in the present example, the sound of fluid leaking from a vessel could be mapped to a particular remedial action, such as to jump to a part of the video presentation on how to stem the leak.

Alternatively, in one such case, the user may be instructed in the audiovisual presentation, to strike the radiator of a car, to ascertain whether the cooling system of the car is full or empty. Depending on the sound detected, the sequence to sequence generator may issue a navigation instruction to cause a jump in the presentation to a part of the presentation explaining how to fill the radiator with coolant fluid.

The present disclosure contemplates that a navigation instruction may comprise a jump to another part of a particular document or presentation, or a command to load another document or presentation indicative of the required content for presentation to the user.

3. Document Type

It may be convenient to respond to the type of document content. So, for example, if a sequence to sequence generator encounters sheet music, it can be responsive to that document to create navigation commands responsive to the music being played. In that way, the sequence to sequence generator can generate a navigation command to move the displayed part of the music forward as the player progresses. This could include a "page turn" command, if it is considered preferable to a user to present a single page of a music score to a user at a time, rather than producing a scrolling effect on screen.

Overview

Figure 5:
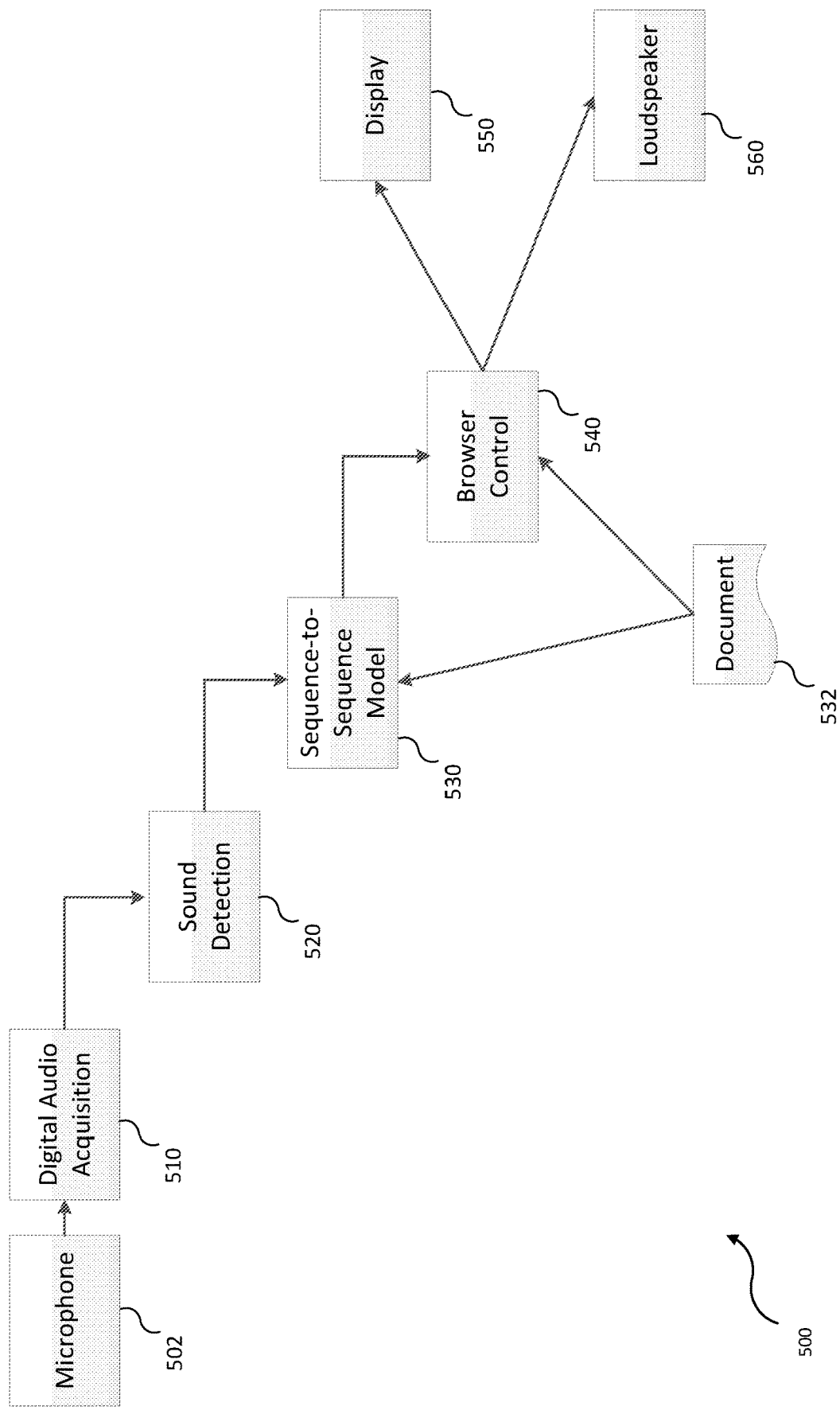
FIG. 5 is a process architecture diagram illustrating an implementation of an embodiment and indicating function and structure of such an implementation.

As shown in FIG. 5, the overall structure and function of a system 500 designed to implement the above use cases is presented. In this case, a first digital audio acquisition block 510 receives audio signal from a microphone 502, and produces a sequence of waveform samples. These samples are passed to a sound detection block 520, which produces sound identifiers for each sound event detectable on the waveform samples. Each sound identifier comprises information identifying the sound event, i.e. what the sound is, whether it is starting or ending (or, in some cases, the duration of the event), and the time of the event.

The sound identifiers are passed to a sequence to sequence model block 530, which has acquired information from a document 532 as to a correspondence between likely encountered sound events and navigation through the document. The acquired information may be as a result of information embedded in the document, such as mark-up, or it could be ascertained through inference, text analysis or image analysis, including the involvement of machine learning algorithms.

When a sequence of sound identifiers is received at the sequence to sequence model block 530 which corresponds with a navigation action, a sequence of navigation, or browsing, commands is passed to a browser control block 540. This controls the browsing function over the document 532, to produce a corresponding display output at a display 550 and/or an audio output at a loudspeaker 560.

Separate computers can be used for the various stages of processing. So, for instance, digital audio acquisition and sound detection can be performed in a sound recognition computer. The sequence to sequence model can be constructed, held and used at a sequence to sequence translator computer, to produce the sequence of browsing commands. A browsing computer can host the browser control block, the display and the loudspeaker, to present the user experience to the user.

Alternatively, all of the above functions can be provided on the same computing device.

In summary, therefore, as the examples show, the present disclosure enables a non-intentional navigation paradigm—a user can carry out functions supported by content on a computer, without having to intentionally issue or input navigation instructions.

Thus, it can be seen that embodiments described herein use sound recognition to improve a user's experience of a computing device by adapting to the environment of the user, and avoiding the need for navigation through a document to be initiated by deliberate user action.

The invention claimed is:

1. A computer for controlling navigation through a computer readable structured document, for production of an output to a user corresponding to that structured document, navigation being effected by one or more navigation commands, the computer comprising:

an audio receiver for receiving a stream of audio waveform samples;

a sound detector operable to detect on the stream of audio waveform samples, one or more non-verbal sound events, wherein the sound detector is operable to detect a sound event on the basis of one or more machine learned sound models, and, for each detected sound event to produce a sound identifier, each sound identifier comprising information identifying the corresponding sound event, and to construct a sequence of sound identifiers corresponding to detected sound events in the stream of audio waveform samples;

a sequence to sequence decoder operable to receive a sequence correspondence model for the structured document, the sequence correspondence model encoding correspondence between one or several sound event identifiers and one or several navigation commands for navigating through the structured document, the sequence to sequence decoder being further operable, on the basis of the sequence correspondence model, to convert the sequence of sound identifiers into a sequence of one or more navigation commands for navigating through the structured document;

a content navigator, responsive to navigation commands from the sequence to sequence decoder, to cause navigation through the structured document and generation of a corresponding output to a user.

2. A computer in accordance with claim 1 wherein the sequence to sequence decoder is operable to acquire the sequence correspondence model from the structured document.

3. A computer in accordance with claim 2 wherein the sequence to sequence decoder is operable to acquire the sequence correspondence model by virtue of processing the structured document to identify one or more elements of the structured document that is associated with a detectable sound event.

4. A computer in accordance with claim 3 wherein the sequence to sequence decoder is operable to acquire the sequence correspondence model by way of text analysis of the structured document.

5. A computer in accordance with claim 3 or claim 4 wherein the sequence to sequence decoder is operable to acquire the sequence correspondence model by way of image analysis of the structured document.

6. A computer in accordance with claim 1, configured to receive a human input action, and wherein the sequence to sequence decoder is operable to acquire a sequence correspondence model on the basis of a received human input action.

7. A computer implemented method of controlling navigation through a structured document, for production of an output to a user corresponding to that structured document, navigation being effected by one or more navigation commands, the method comprising:

receiving a stream of audio waveform samples;

detecting, on the stream of audio waveform samples, one or more non-verbal sound events, on the basis of one or more machine learned sound models, and, for each detected sound event:

producing a sound identifier, each sound identifier comprising information identifying the corresponding sound event, and constructing a sequence of sound identifiers corresponding to detected sound events in the stream of audio waveform samples;

receiving a sequence correspondence model for the structured document, the sequence correspondence model encoding correspondence between one or several sound event identifiers and one or several navigation commands for navigating through the structured document;

converting, on the basis of the sequence correspondence model, the sequence of sound identifiers into a sequence of one or more navigation commands for navigating through the structured document;

causing navigation through the structured document responsive to the sequence of one or more navigation commands, and generating a corresponding output to a user.

8. A computer implemented method in accordance with claim 7 wherein the converting comprises acquiring a sequence correspondence model from the structured document.

9. A computer implemented method in accordance with claim 8 wherein the sequence correspondence model is acquired by processing the structured document to identify one or more elements of the structured document that is associated with a detectable sound event.

10. A computer implemented method in accordance with claim 9 wherein the acquiring of the sequence correspondence model is by way of text analysis of the structured document.

11. A computer implemented method in accordance with claim 9 wherein the acquiring of the sequence correspondence model is by way of image analysis of the structured document.

12. A computer implemented method in accordance with claim 7, wherein the converting comprises acquiring a sequence correspondence model based on a received human input action.

* * * * *